April 5, 1932.  J. HALL  1,852,927
AEROPLANE
Filed March 17, 1931   6 Sheets-Sheet 1
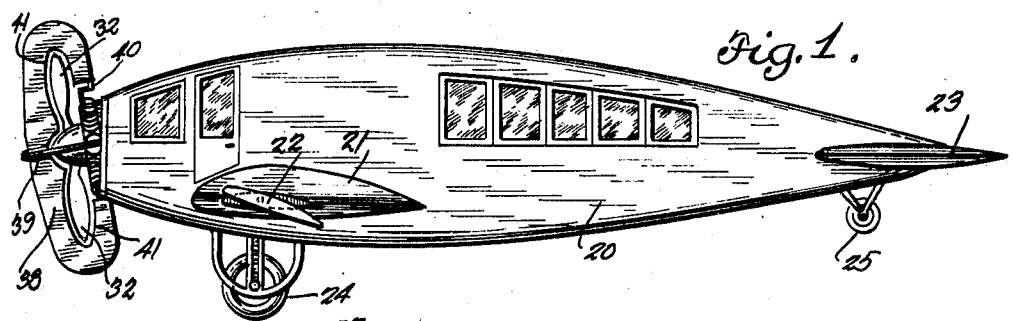
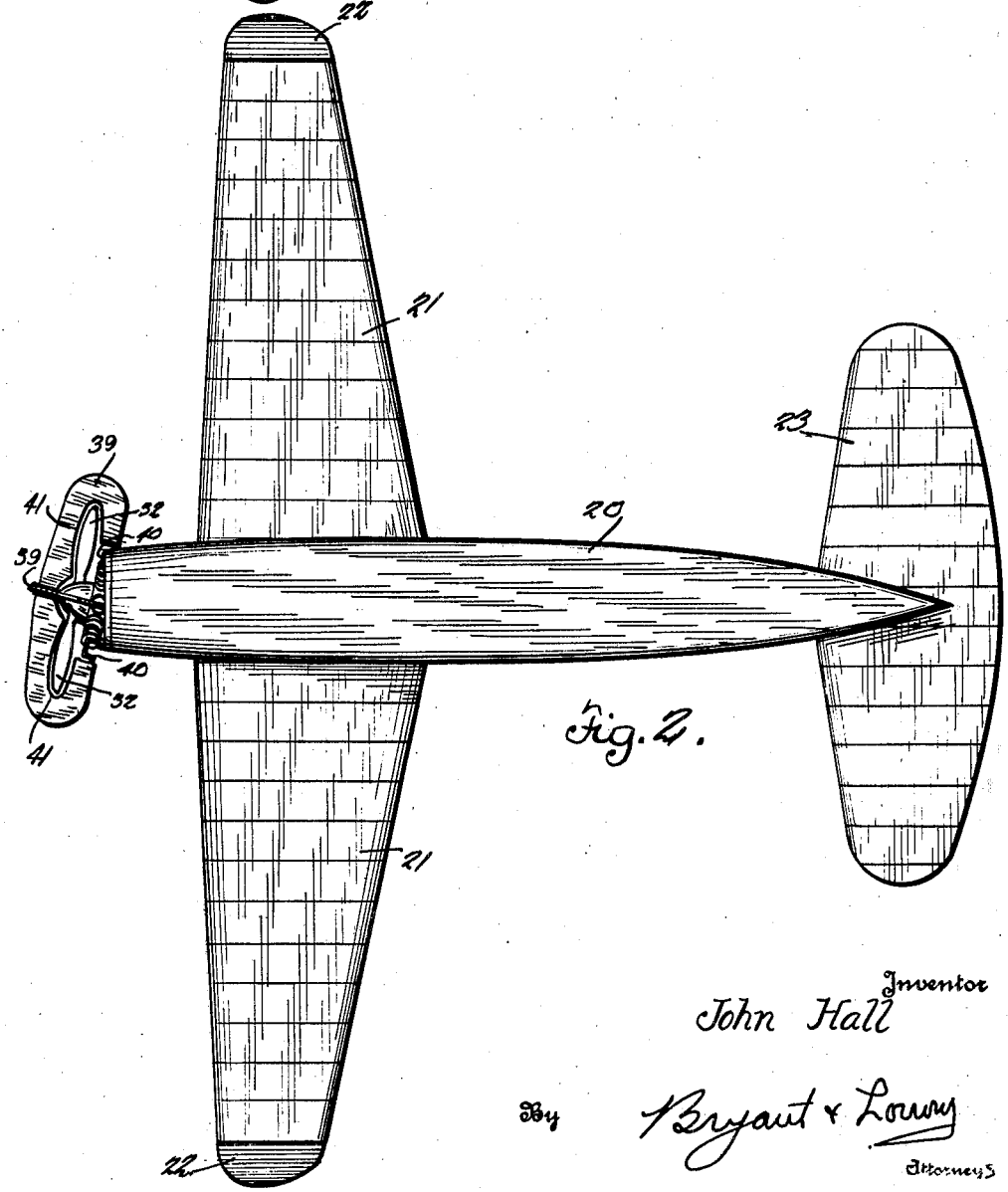
Inventor
John Hall
By Bryant & Lowry
Attorneys

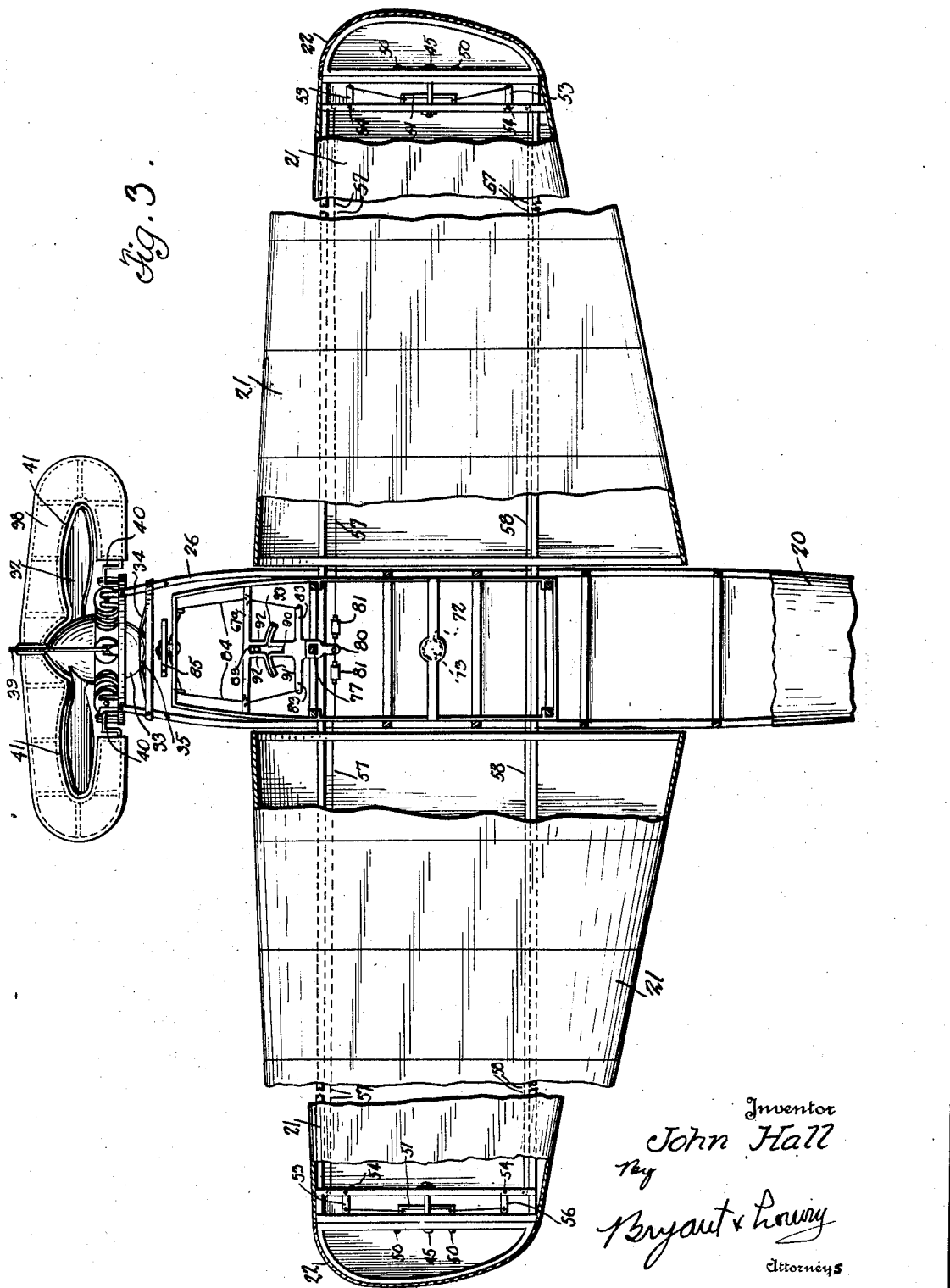

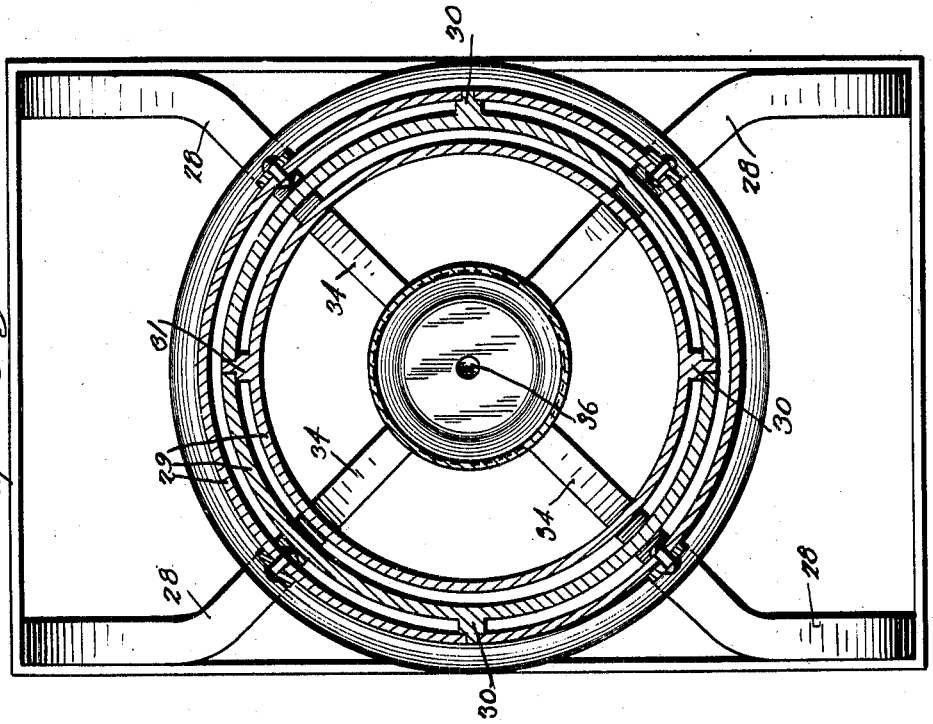
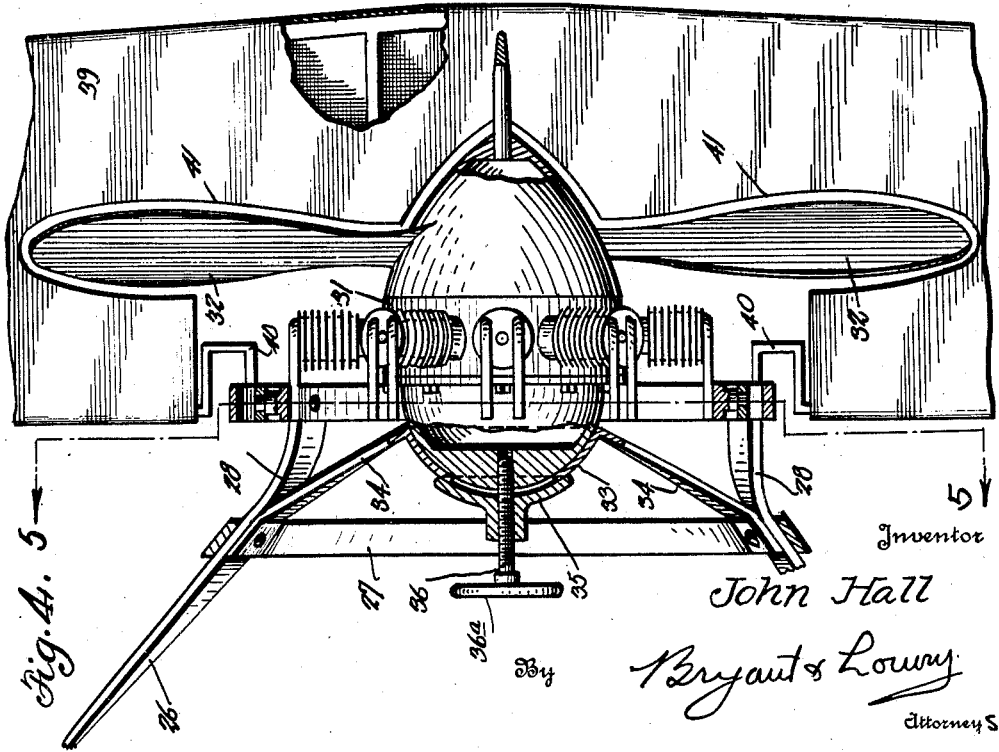

April 5, 1932.    J. HALL    1,852,927
AEROPLANE
Filed March 17, 1931    6 Sheets-Sheet 4
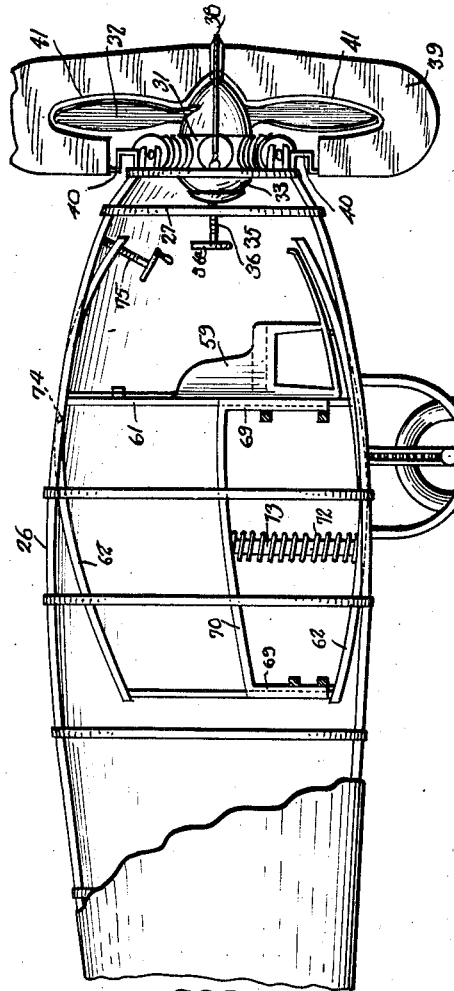
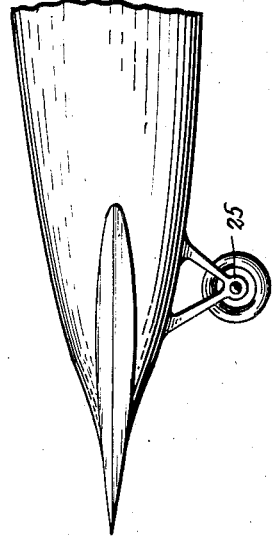
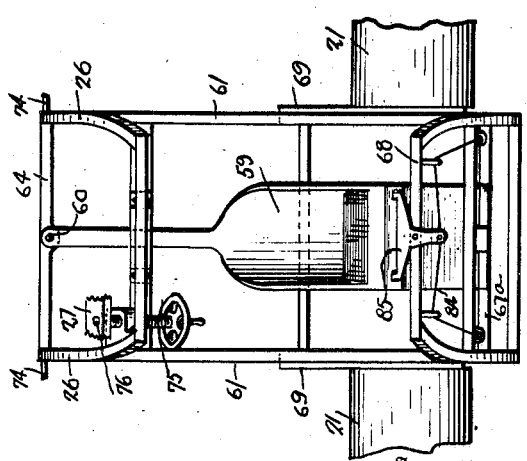
Inventor
John Hall
By Bryant & Lowry
Attorneys

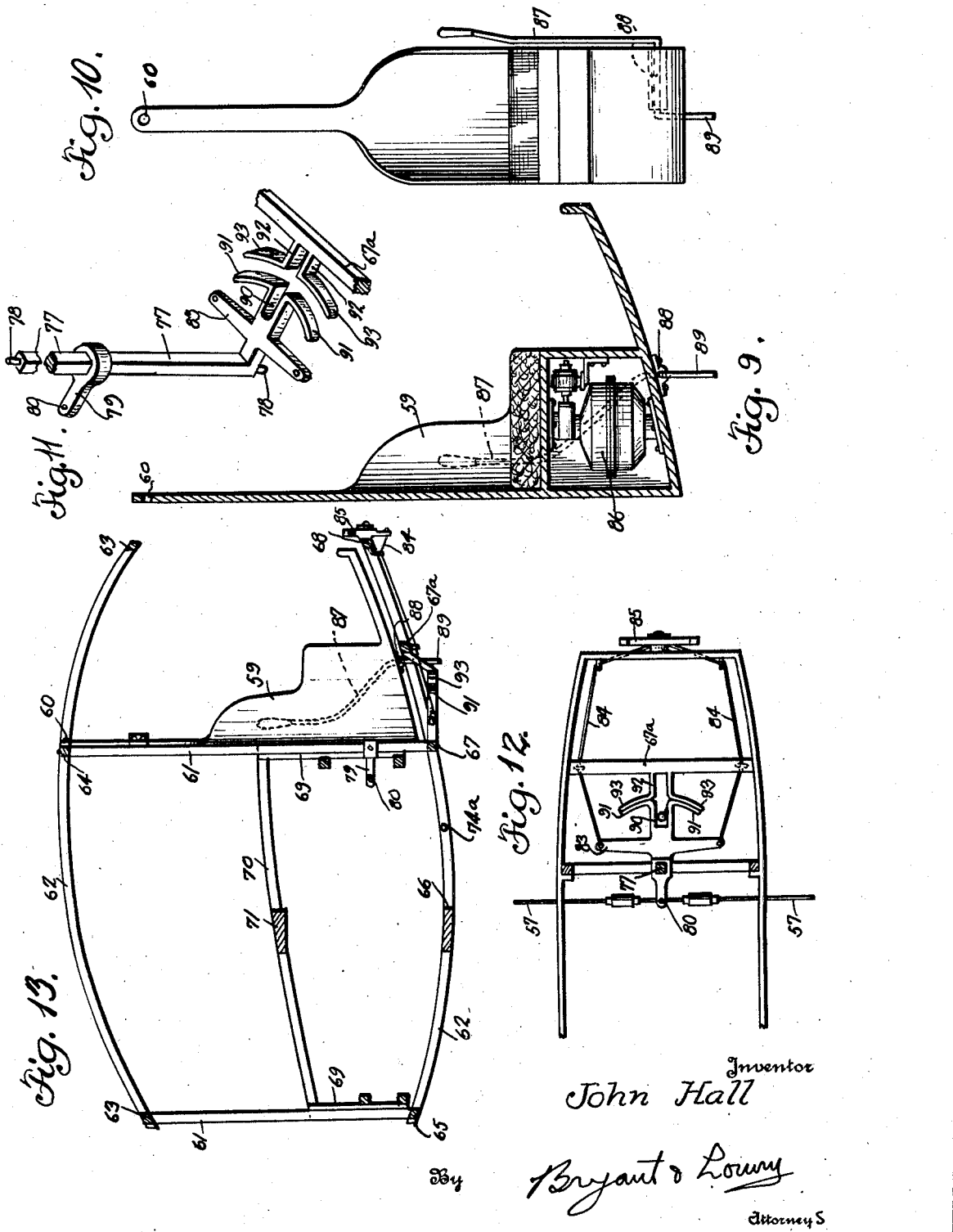

April 5, 1932.  J. HALL  1,852,927
AEROPLANE
Filed March 17, 1931   6 Sheets-Sheet 6
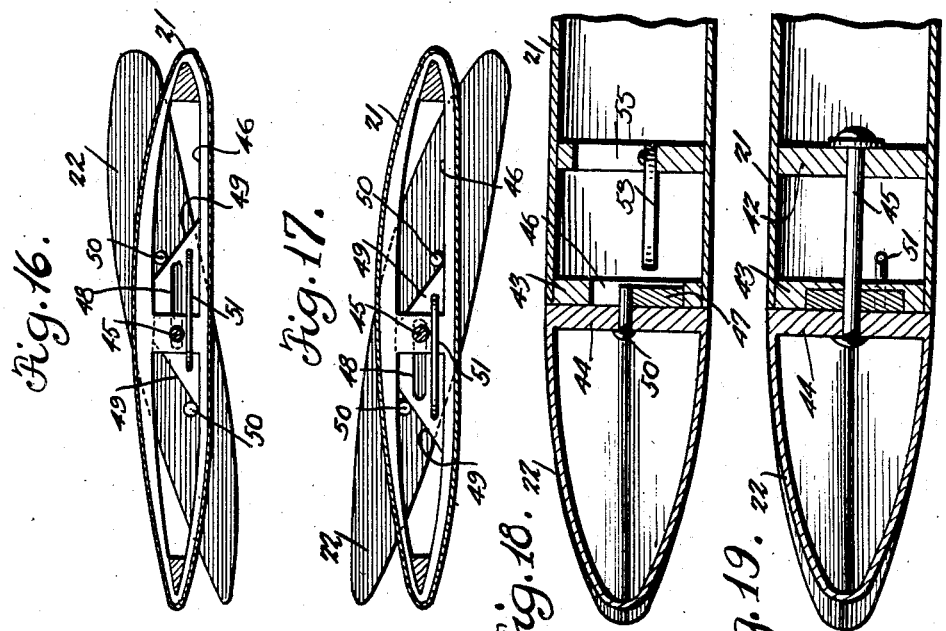
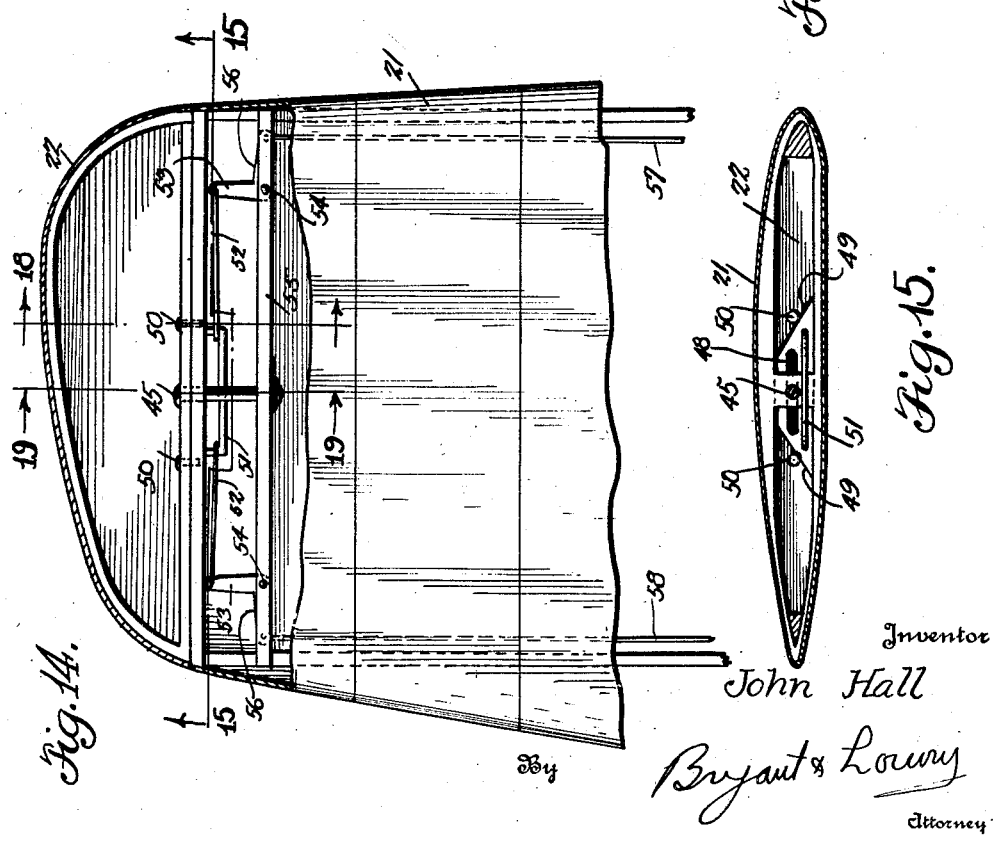
Inventor
John Hall
By Bryant & Lowry
Attorney Patented Apr. 5, 1932

1,852,927

UNITED STATES PATENT OFFICE

JOHN HALL, OF WEST SPRINGFIELD, MASSACHUSETTS

AEROPLANE

Application filed March 17, 1931. Serial No. 523,306.

This invention relates to certain new and useful improvements in aeroplanes.

The primary object of the invention is to provide an aeroplane in which stabilizing ailerons are carried by the terminal tip ends of the wings and constructed for either automatic or manual operation whereby the aeroplane will be returned to an even keel should the same laterally tilt during flight.

A further object of the invention is to provide a combined rudder and elevator associated with a propeller, being manually shiftable upon a universal mounting whereby the direction of travel of the aeroplane may be easily controlled.

Another object of the invention is to provide an aeroplane wherein the wing structure is supported on a carriage with spring devices interposed between the wing structure and carriage permitting vertical wing movement relative to the carriage and aeroplane fuselage for the absorption of shocks during travel and said carriage being pivotally supported on the fuselage with manually operable means for shifting the same for changing the transverse axis of the wing structure relative to the longitudinal axis of the fuselage whereby the wing structure may be employed, as a lift, in addition to the elevator for increasing the speed of ascent of the aeroplane and also for increasing the speed of descent thereof.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view of an aeroplane constructed in accordance with the present invention, showing a terminal wing tip aileron shifted out of alinement with the wing structure and the combination elevator and rudder associated with the propeller with the elevator downwardly tilted;

Figure 2 is a top plan view showing the combined rudder and elevator together with the propeller laterally shifted for functioning of the rudder;

Figure 3 is a fragmentary top plan view, partly broken away and shown in section to illustrate the control devices for the terminal wing tip ailerons the control devices being illustrated in a position for manual operation;

Figure 4 is an enlarged fragmentary elevational view, partly in section of the combined elevator and rudder constituting the guard for the propeller and the adjustable means for the motor, propeller, elevator and rudder;

Figure 5 is a cross-sectional view taken on line 5—5 of Figure 4 showing the universal mounting for the motor, propeller, and associated parts;

Figure 6 is a fragmentary side elevational view, partly broken away to illustrate the spring mounting for the wing structure and the pivotally supported carriage to which the wing structure is attached;

Figure 7 is a fragmentary side elevational view, partly in section of the carriage that supports the wing structure and showing the shifting or adjusting screw therefor;

Figure 8 is a fragmentary elevational view of the carriage and pilot's seat, showing the adjusting means for the carriage and the manually operable means for the terminal wing tip ailerons;

Figure 9 is a detail sectional view of the pilot's seat to be supported like a pendulum with a gyroscope in the base portion thereof for maintaining an upright condition and the hand lever on the seat structure for locking the seat to the wing carriage when it is desired to manually operate the terminal wing tip ailerons;

Figure 10 is a front elevational view of the suspended pilot's seat showing the hand control lever carried thereby;

Figure 11 is a fragmentary perspective view showing the devices associated with the lower end of the pilot's seat with which the lever on the pilot's seat is engageable for rendering the operating mechanism for the terminal wing tip ailerons either manual or automatic;

Figure 12 is a fragmentary plan view of the wing carriage showing the control mechanism for the terminal wing tip ailerons;

Figure 13 is a fragmentary side elevational view, partly in section, similar to Figure 7 and showing the pivotal support for the wing carriage at the lower end of the carriage;

Figure 14 is a fragmentary plan view, partly broken away and shown in section of the outer end of a wing showing the pivotal connection between the wing and ailerons and the operating devices for the aileron;

Figure 15 is a cross-sectional view taken on line 15—15 of Figure 14 showing the wedge block on the outer end of the wing engageable with pins on the terminal wing tip aileron;

Figure 16 is a detail sectional view, similar to Figure 15 showing the wedge block shifted in one direction for the elevation of the leading edge of the aileron;

Figure 17 is a detail sectional view, similar to Figure 16, showing the wedge block shifted in the reverse direction whereby the leading edge of the aileron is lowered;

Figure 18 is a detail sectional view taken on line 18—18 of Figure 14 showing a pin on the aileron engaged by one end of the wedge block; and Figure 19 is a detail sectional view taken on line 19—19 of Figure 14 showing the pivot connection between the wing and the aileron.

Referring more in detail to the accompanying drawings, and particularly Figures 1 to 5, there is illustrated an aeroplane comprising a fuselage 20 provided with side wings 21. To the outer end of each wing a terminal tip aileron 22 is attached, the rear end of the fuselage 20 having the empinage 23 while a forwardly positioned combined elevator and rudder constitutes a guard for a propeller, the fuselage being equipped with landing gear such as forwardly positioned spring supported wheels 24 and a rear skid 25.

The fuselage comprises a frame having longitudinal bars 26 with rectangular frames 27 connecting the same at intervals, and as shown in Figures 4 and 5, the bars 26 extend forwardly of the forward rectangular frame 27 as at 28 for the support of universally mounted rings 29 pivotally connected together as at 30, a motor 31 being supported in the rings for driving radial propeller blades 32. The inner end of the motor 31 is engaged by a dished apertured plate 33 carried by bracket arms 34 connected to the forward rectangular frame 27. A clamping collar 35 overlies the plate 33 and a manually operable screw 36 threaded through the clamping collar 35 has a swivel connection 37 with the adjacent end of the body of the motor 31 for holding the motor and propeller blades in the desired position. A combined rudder and elevator forming a guard for the propeller blade 32 is carried by the universally carried rings 29 and includes a perpendicular rudder blade 38 and a horizontal elevator blade 39 attached to the rings by brackets 40, the blade having cut away portions 41 therein for the passage of the propeller blades 32. Upon releasing the screw 36 by the handle or wheel 36a, the clamping collar 35 is disengaged from the plate 33 and the motor with the propeller blades 32 and the combined rudder and elevator may be shifted in the universal rings 29 for controlling the direction of travel of the aeroplane.

The terminal end tip aileron 22 at the outer end of each wing 21 and the attachment to said wing is shown more clearly in Figures 14 to 19, the outer end of the wing 21 being provided with a pair of spaced cross bars 42 and 43, the inner cross bar 44 on the aileron 22 being engaged with the cross bar 43 on the wing and pivotally retained in position by the center bolt 45 passing through the bars, 42, 43 and 44 as clearly shown in Figures 14 and 19. The bar 43 has a central cut out portion 46 in which a wedge block 47 is slidably mounted, the wedge block having a longitudinal slot 48 therein through which the bolt 45 passes and each end of the wedge block 47 is provided with wedge or cam faces 49 to engage pins 50 carried by the cross bar 44 on the aileron as shown in Figures 16 to 18, causing the aileron when the block 47 is shifted to tilt in the desired direction as illustrated.

The operating means for the wedge block 47 includes an angle strap 51 connected to the block and extending into the space between the cross bars 42 and 43, the opposite ends of the strap 51 having a link connection 52 with one leg 53 of a bell crank lever that is pivotally mounted as at 54 in a cut out portion 55 in the cross bar 42, the other leg 56 of the two bell crank levers having wires or cables 57 and 58 connected thereto, the cable 58 extending between the bell crank levers at the trailing edge of the wings while the forwardly positioned cable 57 is engaged with operating mechanism therefor.

The operating mechanism for the terminal wing tip ailerons is associated with the pilot's seat 59 that is suspended at its upper end as at 60 on a carriage that is pivotally mounted in the framework of the fuselage. The carriage includes perpendicular corner posts 61 connected at their upper and lower ends by arched side rails 62, upper cross rails 63 and 64 and lower cross rails 65, 66, 67 and 68. The corner posts of the carriage are preferably rectangular in cross section and constitute guides for channel slides 69 to which the side wings 21 are attached, the upper ends of the guides 69 being connected by side rails 70 and a cross rail 71 between the side rails 70 with a cushioning spring 72 surrounding the telescoping guide 73 interposed between the cross rails 66 and 71 as shown in Figure 7. The wings 21 are therefore resiliently supported on the carriage and during flight, they shift perpendicularly of the carriage against the tension of the spring 72 for the absorption of shocks. It is intended that the carriage be pivotally shifted on its pivotal support 74 upon the longitudinal frame bars 26 whereby the line of transverse axis of the wings may be changed relative to the longitudinal axis of the fuselage so that the wings may be shifted for causing increased speed of ascent and descent of the aeroplane and to accomplish this adjustment of the carriage with the wings carried thereby, there is provided as shown in Figures 6 to 8 a manually operated screw 75 threaded through the forward upper cross bar 63 of the carriage and having a swivel connection 76 with a rectangular frame member 27, the carriage being shifted upon its pivot 74 which also accomplishes in addition to change of angularity of the wings, a limited forward and rearward movement thereof. As shown in Figure 13, the pivot 74a for the carriage is associated with the lower arched rail 62 so that only a pivotal movement of the wings is accomplished without translation thereof.

A bar 77 rectangular in cross section is pivotally mounted at its upper and lower ends as at 78 in the cross bars 64 and 67 of the carriage and an arm 79 radially projecting from the bar 77 is connected as at 80 to the forward edge run of cable 57 as shown in Figure 3, slack adjusters 81 being embodied in the cable. As shown in Figures 3 and 11 the lower end of the bar 77 carries a lateral leg 82 with a cross arm 83 thereon, the outer ends of the cross arm having cable connection 84 with the lower end of a foot operated lever 85 so that when said lever is manually operated, the cables 84 attached to the cross arm 83 move the bar 77 upon its pivotal mounting and by the arm connection 79 between the bar 77 and cable 57 the terminal end ailerons of the wings are shifted at will.

The pilot's seat 59 is pivotally suspended as at 60 as previously described and as shown in Figure 9 embodies a motor operated gyroscope 86 for maintaining an even balance of the seat. It is also intended that movement of the suspended seat, or rather movement of the aeroplane body with the seat remaining in a perpendicular position shall be utilized as operating means for the wing ailerons and to accomplish this operation, the operating lever 87 pivotally mounted upon the seat 59 as at 88 has a depending end 89 adapted to be moved into the slot 90 formed in the free end of the leg 82 as shown in Figures 11 and 12, being guided into said slots by the lateral curved wings 21 at the outer end of the leg 82. With the lever end 89 positioned in the leg slot 90 as shown in Figure 12, lateral tilting of the aeroplane body with the seat 59 remaining perpendicular, effects operation of the devices for moving the bar 77 and the cable 57 for the operation of the aileron.

When it is desired to have manual operation of the wing tip ailerons, the pilot's seat 59 is locked to the carriage for shifting the lever end 89 between the side legs 92, the lever end being guided therein by the lateral wings 93, the legs 92 being carried by the cross bar 67a connecting the lower side arched rails of the carriage, this position of the lever end being illustrated in Figure 3. When so disposed, the pilot's seat 59 is locked to the carriage and operation of the wing tip ailerons is entirely manual, being accomplished by a foot lever 85.

From the above detailed description of the invention, it is believed that the construction and operation thereof will at once be apparent, it being noted that the universal mounting for the motor and propeller together with the combined elevator and rudder associated therewith provides manual control of the rudder and elevator with the propeller blade moving therewith for controlling the direction of travel of the aeroplane. By pivotally supporting the pilot's seat and associating the same with the terminal end ailerons on the wings and with the pilot's seat suitably weighted or provided with gyroscope to maintain the same in a perpendicular position, said ailerons are automatically operated when the aeroplane body tilts to either side for the purpose of bringing the aeroplane to an even keel. It is also possible to manually shift or operate the wing end ailerons by locking the pivotally suspended pilot's seat to a part of the aeroplane body, such as the carriage for the wings. The adjustment of the carriage which carries the wings provides a change of angularity between the wings and the aeroplane body to increase the speed of ascent or descent of the aeroplane and said carriage being resiliently supported, shocks incident to travel as when encountering air pockets or eddies is absorbed by the carriage and wing structure and relieved from the aeroplane fuselage.

While there is herein shown and described the preferred embodiment of the present invention, it is nevertheless to be understood that minor changes may be made therein without departing from the spirit and scope of the invention as claimed.

I claim:

1. In an aeroplane of the character described, a fuselage, a carriage pivotally mounted therein and side wings carried by the carriage, and a resilient connection between the side wings and carriage.

2. In an aeroplane of the character described, a fuselage, a carriage pivotally mounted therein, side wings carried by the carriage, and manually operable means for moving the carriage on its pivot to vary the angularity of the wings relative to the fuselage to increase the speed of ascent and descent of the aeroplane.

3. In an aeroplane of the character described, a fuselage, side wings, a terminal end aileron on the outer end of each wing, pivotally connected to the wing, a pair of spaced pins on the aileron, a sliding double cam block engageable with the pins to move the aileron on its pivot, and automatic and manually operable means for sliding the block for operating the ailerons.

4. In an aeroplane of the character described, a fuselage, side wings, a terminal end aileron on the outer end of each wing, pivotally connected to the wing, a pair of spaced pins on the aileron, a sliding double cam block engageable with the pins to move the aileron on its pivot, and automatic and manually operable means for sliding the block for operating the ailerons, including a pivotally suspended pilot's seat, a pivoted leg adjacent the seat, cable connections between the leg and silding block, and means for connecting the seat to the leg for the automatic operation of the ailerons.

5. In an aeroplane of the character described, a fuselage, side wings, a terminal end aileron on the outer end of each wing, pivotally connected to the wing, a pair of spaced pins on the aileron, a sliding double cam block engageable with the pins to move the aileron on its pivot, automatic and manually operable means for sliding the block for operating the ailerons, including a pivotally suspended pilot's seat, a pivoted leg adjacent the seat, cable connections between the leg and sliding block, means for connecting the seat to the leg for the automatic operation of the ailerons, and means for holding the seat against pivotal movement and spaced from the leg whereby the ailerons may be manually operated.

6. In an aeroplane of the character described, a fuselage, side wings, a terminal end aileron on the outer end of each wing, pivotally connected to the wing, a pair of spaced pins on the aileron, a sliding double cam block engageable with the pins to move the aileron on its pivot, automatic and manually operable means for sliding the block for operating the ailerons, including a pivotally suspended pilot's seat, a pivoted leg adjacent the seat, cable connections between the leg and sliding block, means for connecting the seat to the leg for the automatic operation of the ailerons, and a weighted gyroscope carried by the seat to maintain the same perpendicularly suspended.

7. In an aeroplane of the character described, a fuselage, side wings, a terminal aileron on the outer end of each wing, said wings being vertically shiftable relative to the fuselage, operating means for the ailerons including a journalled perpendicular shaft on the fuselage, a cable connecting the two ailerons, an arm vertically slidable on the shaft and attached to the cable and automatic and manually operable means for rotating the shaft.

8. In an aeroplane of the character described, a fuselage, side wings, a terminal aileron on the outer end of each wing, said wings being vertically shiftable relative to the fuselage, operating means for the ailerons including a journalled perpendicular shaft on the fuselage, a cable connecting the two ailerons, an arm vertically slidable on the shaft and attached to the cable and automatic and manually operable means for rotating the shaft, including a pivotally suspended pilot's seat for automatically rotating the shaft, and means for rendering the pilot's seat inoperative.

In testimony whereof I affix my signature.

JOHN HALL.